United States Patent
Taitler et al.

(10) Patent No.: US 12,455,556 B2
(45) Date of Patent: Oct. 28, 2025

(54) DEVICE AND METHOD FOR SCHEDULING A SET OF JOBS FOR A PLURALITY OF MACHINES

(71) Applicant: Robert Bosch GmbH, Stuttgart (DE)

(72) Inventors: Ayal Taitler, Haifa (IL); Christian Daniel, Leonberg (DE); Dotan Di Castro, Haifa (IL); Felix Milo Richter, Heidenheim (DE); Joel Oren, Tel Aviv (IL); Maksym Lefarov, Stuttgart (DE); Nima Manafzadeh Dizbin, Istanbul (TR); Zohar Feldman, Haifa (IL)

(73) Assignee: ROBERT BOSCH GMBH, Stuttgart (DE)

( * ) Notice: Subject to any disclaimer, the term of this patent is extended or adjusted under 35 U.S.C. 154(b) by 865 days.

(21) Appl. No.: 17/179,702

(22) Filed: Feb. 19, 2021

(65) Prior Publication Data
US 2021/0312280 A1    Oct. 7, 2021

(30) Foreign Application Priority Data
Apr. 3, 2020    (DE) .......................... 102020204351.5

(51) Int. Cl.
*G05B 19/418*    (2006.01)
*G06F 18/21*    (2023.01)
(Continued)

(52) U.S. Cl.
CPC ..... *G05B 19/41865* (2013.01); *G06F 18/217* (2023.01); *G06F 18/24323* (2023.01);
(Continued)

(58) Field of Classification Search
None
See application file for complete search history.

(56) References Cited

U.S. PATENT DOCUMENTS 5,826,236 A * 10/1998 Narimatsu ............. G06Q 10/06 700/99
6,438,436 B1 * 8/2002 Hohkibara ............. G06Q 10/06 700/99
(Continued)

FOREIGN PATENT DOCUMENTS

CN    108304253 A    7/2018
EP    4478190 A1 *    4/2024    ........... G06F 9/4837
(Continued)

OTHER PUBLICATIONS

Y. Zhao, Y. Wang, Y. Tan, J. Zhang and H. Yu, "Dynamic Jobshop Scheduling Algorithm Based on Deep Q Network," in IEEE Access, vol. 9, pp. 122995-123011, 2021 (Year: 2021).*
(Continued)

*Primary Examiner* — Jennifer L Norton
(74) *Attorney, Agent, or Firm* — NORTON ROSE FULBRIGHT US LLP

(57) ABSTRACT

A method for scheduling a set of jobs for a plurality of machines. Each job is defined by at least one feature which characterizes a processing time of the job. If any of the machines is free, a job from of the set of jobs is selected to be carrying out by said machine and scheduled for said machine. The job is selected as follows: a Graph Neural Network receives as input the set of jobs and a current state of at least the machine which is free, the Graph Neural Network outputs a reward for the set of jobs if launched on the machines, which states are inputted into the Graph Neuronal Network, and the job for the free machine is selected depending on the Graph Neural Network output.

9 Claims, 2 Drawing Sheets

(51) Int. Cl.
*G06F 18/243* (2023.01)
*G06N 3/04* (2023.01)
*G06N 3/08* (2023.01)
*G06N 5/01* (2023.01)

(52) U.S. Cl.
CPC ............... *G06N 3/04* (2013.01); *G06N 3/08* (2013.01); *G06N 5/01* (2023.01); *G05B 2219/32335* (2013.01)

(56) References Cited

U.S. PATENT DOCUMENTS

| | | | |
|---|---|---|---|
| 2002/0107599 A1* | 8/2002 | Patel | G06Q 10/06393 700/32 |
| 2004/0225391 A1* | 11/2004 | Fromherz | G06Q 10/06 700/100 |
| 2006/0288346 A1* | 12/2006 | Santos | G06F 9/4887 718/102 |
| 2007/0088449 A1* | 4/2007 | Denton | G05B 19/41865 700/99 |
| 2008/0250420 A1* | 10/2008 | Berstis | G06F 9/5072 718/104 |
| 2011/0224816 A1* | 9/2011 | Pereira | G06Q 10/06 700/100 |
| 2011/0264482 A1 | 10/2011 | Rahmouni et al. | |
| 2013/0191843 A1 | 7/2013 | Sarkar et al. | |
| 2013/0245883 A1* | 9/2013 | Humphrey | G07C 5/0841 701/70 |
| 2014/0067108 A1* | 3/2014 | Pedigo | G05B 19/41865 700/108 |
| 2017/0057039 A1* | 3/2017 | Nakayama | B23Q 17/0995 |
| 2017/0243135 A1* | 8/2017 | Ooba | G05B 13/0265 |
| 2017/0336783 A1* | 11/2017 | Rickenbacher | B41F 33/0009 |
| 2018/0150055 A1* | 5/2018 | Shapiro | G05B 19/4063 |
| 2018/0246758 A1* | 8/2018 | Cardonha | G06Q 10/0631 |
| 2019/0086904 A1* | 3/2019 | Fischer | G05B 19/41865 |
| 2020/0393820 A1* | 12/2020 | Lee | G05B 19/41885 |
| 2021/0271965 A1* | 9/2021 | Malynin | G06N 3/08 |
| 2022/0027817 A1* | 1/2022 | Hubbs | G06Q 10/06 |
| 2022/0291658 A1* | 9/2022 | Yeh | G05B 19/4097 |
| 2023/0004880 A1* | 1/2023 | Mieth | G06Q 10/043 |
| 2023/0324891 A1* | 10/2023 | Crawford | G05B 19/41865 700/100 |
| 2024/0127031 A1* | 4/2024 | Yous | G06N 3/105 |
| 2024/0211825 A1* | 6/2024 | Wu | G06Q 10/06311 |
| 2024/0319718 A1* | 9/2024 | Birru | G05B 19/41875 |

FOREIGN PATENT DOCUMENTS

| | | |
|---|---|---|
| JP | 2000271839 A | 10/2000 |
| WO | 2020040763 A1 | 2/2020 |

OTHER PUBLICATIONS

X. Liang, W. Song and p. Wei, "Dynamic Job Shop Scheduling via Deep Reinforcement Learning," 2023 IEEE 35th International Conference on Tools with Artificial Intelligence (ICTAI), Atlanta, GA, USA, 2023, pp. 369-376 (Year: 2023).*
T. Zhang, S. Xie and O. Rose, "Real-time job shop scheduling based on simulation and Markov decision processes," 2017 Winter Simulation Conference (WSC), Las Vegas, NV, USA, 2017, pp. 3899-3907 (Year: 2017).*
Li, Yuxi. "Reinforcement learning applications." arXiv preprint arXiv:1908.06973 (2019). (Year: 2019).*
J.-H. Lee and H.-J. Kim, "Imitation Learning for Real-Time Job Shop Scheduling Using Graph-Based Representation," 2022 Winter Simulation Conference (WSC), Singapore, 2022, pp. 3285-3296 (Year: 2022).*
Mao, et al., "Learning Scheduling Algorithms for Data Processing Clusters," Cornell University, 2019, pp. 1-9. <https://arxiv.org/pdf/1810.01963.pdf> Downloaded Feb. 18, 2021.
Liu, et al., "Adapting Improved Upper Confidence Bounds for Monte-Carlo Tree Search," Cornell University, 2015, pp. 1-12. <https://arxiv.org/pdf/1505.02830.pdf> Downloaded Feb. 18, 2021.
Battaglia, P., et al., "Relational Inductive Biases, Deep Learning, and Graph Networks," Cornell University, 2018, pp. 1-40. <https://arxiv.org/pdf/1806.01261.pdf> Downloaded Feb. 18, 2021.
Kocsis, L., et al., "Bandit Based Monte-Carlo Planning," European Conference on Machine Learning, 2006, pp. 1-12. <http://ggp.stanford.edu/readings/uct.pdf> Downloaded Feb. 18, 2021.

* cited by examiner

DEVICE AND METHOD FOR SCHEDULING A SET OF JOBS FOR A PLURALITY OF MACHINES

CROSS REFERENCE

The present application claims the benefit under 35 U.S.C. § 119 of German Patent Application No. DE 102020204351.5 filed on Apr. 3, 2020, which is expressly incorporated herein by reference in its entirety.

FIELD

The present invention relates to a job scheduler for machines, in particular production machines, for selecting successively jobs via a Graph Neural Network. The present invention further pertains to a computer program and a machine-readable storage medium and a system configured to carry out the job scheduler.

BACKGROUND INFORMATION

Optimization of throughput or utilization of resources is challenging and has potential for great cost savings in manufacturing factories and great potential for increasing the productivity.

One challenge lies in the combinatorial nature of the problem. There exist many possible schedules, and the problem of finding the best schedule is often NP-hard. Another challenge is its online (or dynamic) nature. Additional tasks arrive during execution of the current schedule. The characteristics of the arriving jobs are not known with certainty before they arrive.

Mao et al., "Learning Scheduling Algorithms for Data Processing Clusters" (https://arxiv.org/abs/1810.01963) used a reinforcement learning algorithm REINFORCE with graph convolutional embedding for job scheduling on a cluster.

SUMMARY

The present invention provides a job scheduler that is based on reinforcement learning and preferably based further on global search, more precisely by combining a graph convolutional network trained with the DQN (deep Q-network) algorithm and with MCTS (Monte-Carlo tree search).

Advantages of example embodiments of the present invention are given as follows: (1) Said job scheduler has good performance when the scheduling decisions need to be made quickly. In this case there is no time for search, and it is proposed to create a schedule only based on a value network of the DQN. Experiments have shown that schedules created by the value network of the DQN already outperform standard heuristic approaches for scheduling such as rule-based scheduling, e.g., the weighted shortest processing time heuristic. (2) Said job scheduler can make full use of any available time for deliberation. When some time is available for optimizing the schedule via MCTS. Since MCTS is an anytime algorithm, it can be stopped at any time and produce an output schedule. Because using the outputs of the value network of DQN as a search heuristic, the outputted schedule is at least as good as the schedule produced by only the value network. The output continually improves the longer MCTS is run. Given enough time, MCTS can arrive at the optimal schedule. (3) Said job scheduler can take information about how additional tasks arrive over time into account.

In a first aspect of the present invention, a method for scheduling a plurality of jobs is provided. Preferably, it is a computer-implemented method.

An allocating and/or ordering of work to industrial executors as machines, in particular within time slots, can be referred to as scheduling. The set of jobs contains all jobs which have to be carried out and which are currently waiting to be carried out. A job can be understood as a task, which has to be carried out by the machine. The plurality of machines can be identical or similar machines and may be operated in parallel. The machines can be all in one factory or distributed over several factories.

Each job is defined by at least a first feature which characterizes a processing time of the job. The processing time can be a time duration which a machine needs in order to fulfill the corresponding job. Optionally, a second features characterizes an importance of the job.

If any of the machines is free, a job from of the set of jobs is selected to be carrying out by said machine and scheduled for said machine. Ideally, the job is selected such that a total completion time of the set of jobs is minimized. Under a free machine can be understand that either the machine has finished its current job/the current job was cancelled and the machine is able to start a new one or the machine has not started with any job. If a machine carries out a job, the corresponding state of this machine can be referred to as occupied.

The job is selected as follows. A Graph Neural Network (GNN) receives as input the set of jobs and a current state of at least the machine which is free. The GNN is trained to estimate a reward, which would be obtained when carry out a job such that the total completion time is minimized. More precisely, the GNN is trained to output a high reward for a small completion time of the set of jobs.

The current state of the machine can comprise the current setup and remaining processing time. The state of a machine can further comprise, e.g., the class that they are currently set-up for, whether they are currently occupied by some job, and if so, the remaining processing time. Optionally, a time duration until the next maintenance work may be carried out. It is also possible that the GNN receives as input the states of all machines. Then, preferably the non-relevant machines and jobs are masked out, e.g., by zeros.

The GNN outputs a, in particular expected cumulative discounted, reward for the set of jobs if hypothetically launched on the machines, which states are inputted into the GNN. It can be said that the greater the reward the lower the expected total completion time. The job for the free machine is selected depending on the Graph Neural Network output, which achieves the highest reward. Then, one of the free machines or the free machine can receive a command to carry out the selected job.

It is provided that the GNN receives as input a, in particular bipartite and undirected, graph, which comprises two disjoint independent sets of nodes (U, V), where the first set of node (U) comprises for each machine its current state and the second set of node (V) comprises the features of each job within the set of jobs. Furthermore, the graph comprises a set of edges (E), wherein the edges characterize a connection between nodes of the first set of nodes with nodes of the second set of nodes. Additionally, the graph comprises a global information vector relevant for the entire graph. It can be initialized to zero.

The output of the Graph Neural Networks is then a graph of the same structure but with the updated nodes of the sets of nodes U and V, edge and global feature vectors. The updated edges are interpreted as the reward, also referred to as Q-value, of scheduling one of the jobs on one of the machines, which are connected by the respective edge. The updated global feature can characterize an idle action of the machine. Then, it is possible instead of selecting a job depending on the output of the GNN, an idle state of the machine can be selected depending on the output of the GNN.

An advantage of the usage of GNNs allow for applying the same network to problems of different size, i.e., with a different number of jobs or machines.

It is noted that after the job is selected, the job is assigned to the machine, which starts to carry out the job. This procedure can be repeated until all jobs are finished. The selected job can be subsequently removed from the set of jobs.

In accordance with an example embodiment of the present invention, it is provided that the job is defined by a third feature that characterizes a class of a plurality of classes, wherein each of the classes characterize a corresponding setup of the machines required to carry out the corresponding job. Furthermore, the current states of the machines can characterize their current setup. The Graph Neural Network receives a further input, which are time penalties if the machine has to be reconfigured by a change of the setup of any machine due to two immediately successively jobs of different classes for the same machine. The time penalties can be values that can be proportional to a measured or predetermined times, which are can be measured times or estimated based on experiences about reconfiguring the machines.

More precisely, the set of edges of the input graph of the GNN edge features encode the setup time required to process the job corresponding to the node of the second set of nodes on corresponding machine of the first set of nodes.

In accordance with an example embodiment of the present invention, it is further provided that all jobs of the set of jobs are sorted to a queue depending on the output of the GNN. The queue defines an order in which the jobs are proceeded by the plurality of machines. Preferably, the jobs are proceeding according to the queue by the machines. Particularly preferred, the queue is reevaluated after one of the jobs of the queue has been finished.

In accordance with an example embodiment of the present invention, it is further provided that additional jobs arrive at certain points of time during proceeding the jobs and the additional jobs are added to the set of jobs. The advantageous is that the method can also handle dynamic settings, due to the increasing the flexibility of the job scheduler. In order to consider the time of arrival in the selection of the jobs, each job can be defined by another feature characterizing a time stamp when they arrive at the job queue.

In accordance with an example embodiment of the present invention, it is further provided that a parametrization 0 of the Graph Neural Network is optimized by reinforcement learning, in particular by deep Q-Network learning. Preferably, a simulated factory, referred to as a digital twin, is used for the reinforcement learning that reflects the dynamics of the real factory, more precisely, how the state of a factory changes when a job is started. It can be said that the simulated factory corresponds to an environment in which an agent of the reinforcement learning algorithms operates and optimizes its policy.

In accordance with an example embodiment of the present invention, it is further provided that for selecting the subsequent job, a Monte-Carlo Tree Search (MCTS) is applied. The Monte-Carlo Tree Search builds iteratively a search tree starting from the current state of the machines and the set of jobs, wherein for expending the search tree, the output of the Graph Neural Network is used as a search heuristic. Depending on the search tree the subsequent job is selected and/or wherein the Monte-Carlo Tree Search outputs a schedule of jobs.

An advantage of combining the Graph Neural Network with the Monte-Carlo Tree Search results in a scheduling that is very close to an optimal scheduling. Due to the GNN, a simulation of the machines, in particular the factory, is not required.

In accordance with an example embodiment of the present invention, it is further provided that for expending the search tree, the actions are selected based on an Upper Confidence-Bound. This implies that actions with the highest rewards are chosen depending on how often the corresponding action has been already chosen.

In accordance with an example embodiment of the present invention, it is further provided that the search tree is pruned, in particular by considering only a predetermined number k of jobs with the highest rewards within at least one rollout. The advantage is a superior optimization due to the reduced complexity of the search tree, resulting in an improved search behavior of the MCTS.

The machines can be production machines, and logistic robots can be used to supply the production machines with production material required for the current job of the respective machine, wherein the logistic robots are controlled depending on the scheduled jobs.

A production machine can be a manufacturing machine, e.g. a punch cutter, a cutter or a gun drill, preferably of a manufacturing system, e.g., as part of a or a plurality of production lines. It is further proposed that a control system controls the machines depending on the scheduled jobs.

In a second aspect of the present invention, the machines corresponds to depots or delivery locations of goods, wherein depending on the set of jobs, a transportation route for the goods is determined. For this aspect of the present invention, the job scheduler is applied to logistics problems (e.g., planning the route of a courier through a city, where additional points to pick up/drop off items are added while the courier is on his way). It is noted that said job scheduler is not limited to these special applications and can be applied to a bunch of different online or offline scheduling problems or combinatorial optimization problems in diverse industrial areas, e.g., packaging.

Example embodiments of the present invention will be discussed with reference to the figures in more detail.

DETAILED DESCRIPTION OF EXAMPLE EMBODIMENTS

Figure 1:
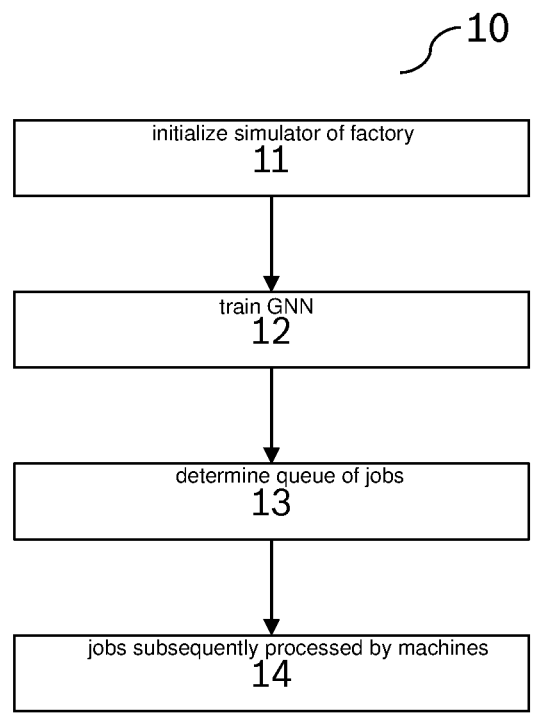
FIG. 1 shows a flow-chart diagram of a method carried out by a job scheduler in accordance with an example embodiment of the present invention.

In the following, a job scheduler in accordance with an example embodiment of the present invention is disclosed, which is built upon both reinforcement learning and global search, more specifically, by combining graph convolutional DQN with MCTS, while allowing one to benefit from the other. Said job scheduler is able to compute a solution to a scheduling problem represented as a graph directly, without the aid of external solvers or simulation environments.

At first, the setting of a problem which can be solved by the job scheduler shall be defined.

In general, the job scheduler shall be able to solve an online scheduling, a particular online combinatorial problem. Note that said job scheduler can be readily extended to other online combinatorial problems such as the travelling salesperson problem and vehicle routing problems, e.g. where the destinations are added online. The online combinatorial optimization problems, including online logistics problems (e.g., planning the route of a courier through a city, where additional points to pick up/drop off items are added while the courier is on his way.

In the following, the embodiment considers scheduling problems where a number of waiting jobs need to be processed by a set of similar machines in particular scheduling in production factories (determining the processing order of goods at different processing steps), as well as scheduling in other industrial areas, e.g., packaging. The machines can be any kind of machine, e.g. a production machine, a transportation machine and so on.

The jobs can belong to different classes. Whenever two jobs of different classes are processed consecutively on the same machine, the setup of the machine needs to be changed, which incurs a time penalty due to the reconfiguration of the machine. Two consecutive jobs of the same class do not incur such a penalty. In addition to their classes, jobs are characterized by their processing times, preferably by their weights (i.e., importance), and preferably by the time when they arrived at the queue.

The total weighted completion time (TWCT) can be defined as:

$$TWCT = \sum_{j \in J} wj * Cj$$

where J is the set of jobs, $w_j$ is the weight of job j, and $C_j$ is its completion time, that is, the difference between the time when j has finished processing and when it arrived in the queue.

The job scheduler is configured to minimize the TWCT.

A state can be characterized by the set of waiting jobs and their characteristics as defined above (e.g. completion time, weight of the jobs, . . . ), and the current state of the machines. Concretely, each machine is represented by a class that they are currently set-up for, whether they are currently occupied by some job, and if so, the remaining processing time. The matrix of setup change times is also observable. Note that a state is treated as a decision point if there are at least one free machine and one waiting job in that state.

Additionally, received sensor signals, e.g. from built-in monitoring sensors of the factory processing machines (e.g., current load, maintenance needs) and sensors that monitor the position and state of jobs within the factory (e.g., silicon wafers), can be used to characterized the state. Optional, a status of the current situation of a material supply chain can be used to characterize the state.

Actions can be represented as tuples (j; m) and correspond to starting job j on machine m. When the action is executed, an event, representing an update to the state, is registered for the time when the job terminates. Alternatively, a no-operation (noop) action can be executed that does not start a job on any of the free machines. In both cases, the simulation is iteratively fast-forwarded to the next event until the next decision point is reached.

There can be static and dynamic settings. In static settings, all relevant jobs are visible in the initial state, e.g. at the beginning of the method o before starting the job scheduler. In the dynamic setting, additional jobs can arrive at certain points in time (i.e., in arrival intervals), where the number of arriving jobs at the start of each interval can be estimated by a Poisson distribution for all classes, each with its own rate. The frequency of job classes can follow Zipf's law. The episode terminates when all the jobs have arrived and finished processing.

The immediate rewards can be given as $r_t$=TWCT($s_t$+1)−TWCT($s_t$), replacing the completion time with the current time for uncompleted jobs. Thus, the total reward of an episode is:

$$\sum_{t=0}^{T-1} r_t = \sum_{t=0}^{T-1} TWCT(s_{t+1}) - TWCT(s_t)p = TWCT(s_T) - TWCT(s_0) = TWCT(s_T)$$

Note that the current time is 0 in $s_0$ so TWCT($s_0$)=0, and that all jobs are completed in $s_T$, so TWCT($S_T$) is just the TWCT objective value.

Explanation for the choice for the deep Q-network (DGN): Q Graph Neural Network.

The above described problem of online scheduling can be seen as a Markov Decision Process (MDP), where S and A are the state and action spaces respectively, and P($s_0$|s,a) denotes the probability of transitioning from state s∈S to state s'∈S when applying action a∈A. To solve the MDP formulation, a reinforcement learning algorithm is applied. Preferably, an off-policy DQN algorithm can be used that learns an approximation to Q(s,a) function, which represents the cumulative discounted reward for applying a at s and then following some policy of actions which could be greedy or explorative. For more information about the Q function, the reader is referred to the document: Bertsekas, D. "Dynamic programming and optimal control", Athena scientific Belmont, MA, 2005.

Due to both the large state space S and the Q function complexity, a neural network parametrized by e is a common choice for Q function approximation.

This approximation can be trained to minimize the squared temporal difference denoted by:

$$TD \cong r(s, a) + \gamma \max_{a'} Q(s', a'; \theta) - Q(s, a; \theta)$$

with the discount factor y and an immediate reward r(s, a).

A GNN is utilized as Q function approximation in the DQN algorithm implementation. GNN is a common name for a framework, where a neural network or a set of neural networks is repetitively applied to the graph representation of the input data. GNNs have several properties that are important in a context of combinatorial optimization: They are permutation equivariant and are able to process observations of varying sizes (i.e., different number of nodes and edges) as long as features dimensionality remains constant. In addition, GNNs are able to leverage the relational bias in observations via multi-step propagation of information within the graph representation, i.e., message-passing.

For the scheduling problem, each observation is represented with a bipartite, undirected graph represented by the tuple G=(w; U; V; E).

In the proposed encoding U and V correspond to two disjoint independent sets of nodes, where $u_i$ is the feature vector of machine i and vi the feature vector of job j. The machine and job feature vectors consist of the characteristics described above. The actual feature vector of every node $u_i \in U$ and $v_j \in V$ is the concatenation of machine and job features where the irrelevant dimensions can be masked by zeros. The sets of machine and job nodes are interconnected by the set of edges E=($e_k$, $m_k$, $j_k$), where $e_k$ is a edge feature vector, $m_k$ is an index of a machine node, and $j_k$ an index of a job node connected by the edge k. Edge features encode the setup time required to process the job $j_k$ on corresponding machine $m_k$. Additionally, the graph representation contains a parameter w that is the global information vector. This parameter w is referred to as global feature and is initialized to 0 for every observation and is used for the information propagation during the message-passing.

Preferably, the encoding message-passing decoding GNN architecture is used as described by Battaglia, P. W et al. "Relational inductive biases, deep learning, and graph networks", arXiv preprint arXiv: 1806.01261, 2018.

The output of the GNN is a graph of the same structure but with the updated nodes $u_i$ and $v_j$, edge $e_k$ and global w feature vectors. Feature $e_k$ of edge k is interpreted as the Q-value of scheduling job $j_k$ on machine $m_k$ and global feature w as the Q-value of noop action.

For learning the Q function, a simulator of the machines is applied that models the problem as a discrete event simulation. Preferably, a simulated factory, a.k.a. "digital twin", is applied that reflects the dynamics of a real factory, i.e., how the state of the factory changes when a job is started on a machine and how additional tasks arrive over time. In an alternative embodiment, recorded data from the machines or from the factory can be used as training data for learning the Q function or the recoded data can be used to build the simulator. As already stated above, the DGN learning is preferably utilized to learn the Q function and train the GNN.

After the GNN is trained, it can be straight forward applied to schedule jobs on a plurality of machines. For example, if a decision point occurs, the above described inputs of the GNN are proceed of the current situation at the point of time when the decision point occurs. Depending on the output of the GNN, from the set of waiting jobs, the next job is selected with the highest Q value. This procedure can be applied each time, if decision points occur. Interestingly, this procedure is neither limited to static nor to dynamic settings.

For the case, that the decision point occurs or for the case, that a complete schedule of all waiting jobs shall be scheduled into one schedule or queue, a Monte-Carlo Tree Search can be used. Monte-Carlo Tree Search (MCTS) is an online planning method for sequential and (possibly) stochastic decision problems. MCTS operates by searching for the optimal decision to make at each state via iteratively sampling rollouts: sequences of steps that begin in the current state and end in either terminal states or states that were reached by the end of the planning horizon. These rollouts are used to build a search tree, which stores information about the visited states. Such information includes Q-value estimations $Q^T(s; a)$ that are used to guide the search in subsequent rollouts and eventually, when timeout is reached, output a decision for the current state.

While MCTS is capable of finding high-quality decisions without incorporating any domain-specific knowledge, the availability of good domain-specific heuristics can significantly facilitate the search process, yielding better decisions in shorter deliberation times. Preferably, a variation of MCTS algorithm called UCT (for more information: Kocsis, L. and Szepesvari, C. "Bandit based monte-carlo planning", In European conference on machine learning, pp. 282-293. Springer, 2006) is applied in conjunction with the trained GNN. In particular, rollouts are sampled by choosing actions according to the Upper Confidence-Bound (UCB, for more details: see also Kocsis et al or Liu et al "Adapting improved upper confidence bounds for Monte-Carlo tree search", In: Advances in Computer Games. Springer, Cham, 2015. S. 53-64) policy for states that are inside the search tree (i.e., added to the tree in preceding rollouts), and otherwise choose the action with the highest Q-value estimate $Q^N(s; a)=Q(s; a; \theta)$, obtained from the trained GNN. UCB balances exploration and exploitation by trying first all actions once, and afterwards choosing the action that maximizes the value:

$$Q^T(s, a) + \beta \frac{\log(n_s)}{n_{s,a}}$$

where $n_{s,a}$ denotes the number of times action a was sampled in state s, $n_s = \in n_{s,a}$, and $\beta$ is the exploration factor.

The Q-values in each states are estimated as:

$$Q^T(s, a) = \sum_{i=1}^{n_{s,a}} \frac{\overline{r}_i}{n_{s,a}}$$

where $\overline{r}_i$ is the sample (rollout) i accumulated reward from state s until the end of the rollout.

Since the number of actions in some cases can be quite large, often leading to poor performance, a pruning mechanism can be applied that makes use of the GNN in additional manner. Namely, during search, only the k actions with the highest Q-values estimates $Q^N(s; a)$ are considered.

Given the current state, the MCTS can be applied to generate the search tree, wherein depending on the search tree, the schedule of jobs is derived, e.g. choosing the branches of the search tree which results in the shortest TWCT.

MCTS can be run for as much time as is available for optimization (e.g. seconds to minutes) or until an optimal job queue is found.

FIG. 1 shows a flow chart (10) of one embodiment to train the job scheduler and to carry out the job scheduler.

The method starts with step 11. In this step, the simulator of the factory is initialized.

In the subsequent step 12, the GNN is trained, wherein a reinforcement learning algorithm, in particular DGN is applied. The reinforcement rithm is carried out on the simulator to explore the simulator and its behavior for given actions at given states.

If the training of the GNN is terminated, step 13 follows. For a given state of the machines and a set of jobs, a queue of jobs is determined. The queue is determined by the MCTS as described above.

It is noted that determining the queue of jobs via the MCTS can be started if all or part of the machines are free or if the decision point is reached for one machine.

After the queue is obtained, the jobs are subsequently proceeded by the machines in step 14. For example, after a job queue has been determined by the MCTS or a next job has been determined depending on the Q-value, the next job is assigned to the corresponding determined machine. The machine is then controlled to carry out its newly assigned job.

If the queue of jobs is subsequently proceeded, if a decision point is reached, either the MCTS can be again applied and the next job is not selected from the order of the queue, instead the next job is selected via the updated queue determined by the MCTS search tree, or the next job is selected only depending on the Q value of the GNN, or the oder of the queue is further utilized.

In a further embodiment, depending on the next determined job, a control signal is determined. Said control signal is for controlling the machine and/or is for controlling a physical system e.g., a computer-controlled robot that loads jobs into available machines and/or reconfigures the machine for the required setup for its next job.

Figure 2:
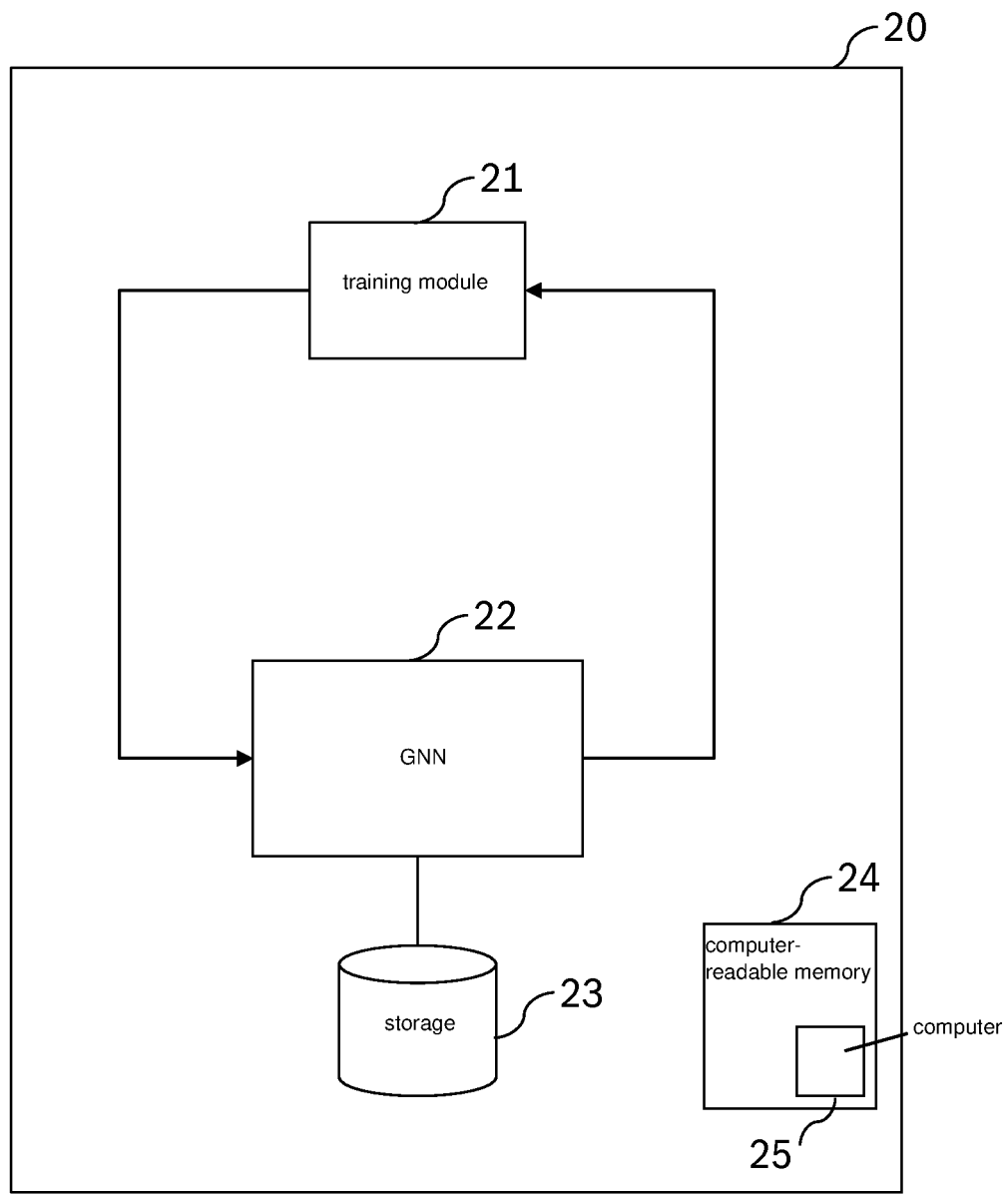
FIG. 2 shows a training system in accordance with an example embodiment of the present invention.

FIG. 2 shows an embodiment of a training system (20) for training the GNN (22). A training module (21) provides training data for the GNN (22) which parameters 0 are stored in a storage (23) and said parameters are updated depending on the output of the GNN (22) by preferably the DGN reinforcement learning.

A computer-readable memory (24) contains instructions, which when carried out on a computing (25) initiate the computer to carry out the training of the GNN.

The term "computer" covers any device for the processing of pre-defined calculation instructions. These calculation instructions can be in the form of software, or in the form of hardware, or also in a mixed form of software and hardware.

It is further understood that the procedures cannot only be completely implemented in software as described. They can also be implemented in hardware, or in a mixed form of software and hardware.

What is claimed is:

1. A method for scheduling a set of jobs on a plurality of machines, each job being defined by at least one feature which characterizes a processing time of a job, the method comprising:
   when any of the plurality of machines is a free machine:
   selecting a job from of the set of jobs to be carried out by the free machine,
   scheduling the selected job on the free machine, wherein each of the plurality of machines is a cutter for cutting or a gun drill for drilling in a manufacturing system, wherein the job is selected by:
   receiving as input, by a Graph Neural Network, the set of jobs and a current state of each machine of at least one of the plurality of machines, the at least one of the plurality of machines including the free machine,
   outputting, by the Graph Neural Network, rewards for each job launched on the at least one of the plurality of machines, which states are inputted to the Graph Neural Network, and
   selecting the job for the free machine depending on the Graph Neural Network outputted rewards to carry out the selected job at a minimized total completion time, wherein a parametrization θ of the Graph Neural Network is optimized by deep Q-Network learning, and wherein for selecting a subsequent job, a Monte-Carlo Tree Search is applied, wherein the Monte-Carlo Tree Search builds iteratively a search tree starting from the current state of each of the plurality of machines and the set of jobs, wherein for expending the search tree, the outputted reward of the Graph Neural Network is used as a search heuristic, wherein the subsequent job involves a physical performance of a task by the free machine, and wherein depending on the search tree the subsequent job is selected; and
   controlling the free machine to perform the physical performance of cutting or drilling in the subsequent job using a generated control signal
   performing the physical performance of the subsequent job by the free machine, wherein the free machine includes a robot, wherein a control signal is generated in accordance with the subsequent job, and wherein the performing includes applying the control signal for causing the robot to execute the physical performance of the subsequent job.

2. The method according to claim 1, wherein the job is defined by a further feature that characterizes a class of a plurality of classes, wherein each of the plurality of classes characterize a corresponding setup of the plurality of machines required to carry out a corresponding job, wherein the current state of each machine also characterize its current setup, and wherein the Graph Neural Network receives a further input, which are time penalties, when the machine has to be reconfigured by a change of the setup of any machines due to two immediately successively jobs of different classes for the same machine.

3. The method according to claim 1, wherein additional jobs arrive at certain points of time and the additional jobs are added to the set of jobs.

4. The method according to claim 1, wherein a parametrization θ of the Graph Neural Network is optimized by reinforcement learning.

5. The method according to claim 1, wherein for expending the search tree, actions are selected based on an Upper Confidence-Bound.

6. The method according to claim 1, wherein the search tree is pruned by considering only a predetermined number of jobs with highest Q-values within at least one rollout.

7. The method according to claim 1, wherein the state of each of the plurality of machines is determined depending on received sensor signals, wherein the state of each of the plurality of machines also includes a current load status and/or a parameter characterizing maintenance needs of respective one of the plurality of machines.

8. A non-transitory machine-readable storage medium on which is stored a computer program for scheduling a set of jobs on a plurality of machines, each job being defined by at least one feature which characterizes a processing time of a job, the computer program, when executed by a processor, causing the processor to perform:
   when any of the plurality of machines is a free machine:
   selecting a job from of the set of jobs to be carried out by the free machine,
   scheduling the selected job on the free machine, wherein each of the plurality of machines is a cutter for cutting or a gun drill for drilling in a manufacturing system, wherein the job is selected by:
   receiving as input, by a Graph Neural Network, the set of jobs and a current state of each machine of at least one of the plurality of machines, the at least one of the plurality of machines including the free machine,
   outputting, by the Graph Neural Network, rewards for each job launched on the at least one of the plurality of machines, which states are inputted to the Graph Neural Network, and
   selecting the job for the free machine depending on the Graph Neural Network outputted rewards to carry out the selected job at a minimized total completion time, wherein a parametrization θ of the Graph Neural Network is optimized by deep Q-Network learning, and wherein for selecting a subsequent job, a Monte-Carlo Tree Search is applied, wherein the Monte-Carlo Tree Search builds iteratively a search tree starting from the current state of each of the plurality of machines and the set of jobs, wherein for expending the search tree, the outputted reward of the Graph Neural Network is used as a search heuristic, wherein the subsequent job involves a physical performance of a task by the free machine, and wherein depending on the search tree the subsequent job is selected; and controlling the free machine to perform the physical performance of cutting or drilling in the subsequent job using a generated control signal performing the physical performance of the subsequent job by the free machine, wherein the free machine includes a robot, wherein a control signal is generated in accordance with the subsequent job, and wherein the performing includes applying the control signal for causing the robot to execute the physical performance of the subsequent job.

9. A system configured to schedule a set of jobs on a plurality of machines, each job being defined by at least one feature which characterizes a processing time of a job, the system configured to:

when any of the plurality of machines is a free machine:

selecting a job from of the set of jobs to be carried out by the free machine, scheduling the selected job on the free machine, wherein each of the plurality of machines is a cutter for cutting or a gun drill for drilling in a manufacturing system, wherein the job is selected by:

receiving as input, by a Graph Neural Network, the set of jobs and a current state of each machine of at least one of the plurality of machines, the at least one of the plurality of machines including the free machine, outputting, by the Graph Neural Network, rewards for each job launched on the at least one of the plurality of machines, which states are inputted to the Graph Neural Network, and selecting the job for the free machine depending on the Graph Neural Network outputted rewards to carry out the selected job at a minimized total completion time, wherein a parametrization θ of the Graph Neural Network is optimized by deep Q-Network learning, and wherein for selecting a subsequent job, a Monte-Carlo Tree Search is applied, wherein the Monte-Carlo Tree Search builds iteratively a search tree starting from the current state of each of the plurality of machines and the set of jobs, wherein for expending the search tree, the outputted reward of the Graph Neural Network is used as a search heuristic, wherein the subsequent job involves a physical performance of a task by the free machine, and wherein depending on the search tree the subsequent job is selected; and controlling the free machine to perform the physical performance of cutting or drilling in the subsequent job using a generated control signal performing the physical performance of the subsequent job by the free machine, wherein the free machine includes a robot, wherein a control signal is generated in accordance with the subsequent job, and wherein the performing includes applying the control signal for causing the robot to execute the physical performance of the subsequent job.

* * * * *